March 18, 1924.

H. J. VENNES 1,487,298

METHOD OF AND APPARATUS FOR VIBRATION

Filed Sept. 5, 1919

Inventor
Harald J. Vennes
by J. E. Roberts Att'y

Patented Mar. 18, 1924.

1,487,298

UNITED STATES PATENT OFFICE.

HARALD J. VENNES, OF NEW YORK, N. Y., ASSIGNOR TO WESTERN ELECTRIC COMPANY, INCORPORATED, OF NEW YORK, N. Y., A CORPORATION OF NEW YORK.

METHOD OF AND APPARATUS FOR VIBRATION.

Application filed September 5, 1919. Serial No. 321,907.

*To all whom it may concern:*

Be it known that I, HARALD J. VENNES, a citizen of the United States, residing at New York, in the county of Bronx and State of New York, have invented certain new and useful Improvements in Methods of and Apparatus for Vibration, of which the following is a full, clear, concise, and exact description.

This invention relates to a method of and apparatus for subjecting various devices to vibration.

The object of this invention is to subject devices, such as audions and the like, to a vibration test for the purpose of detecting any imperfection in the electrode assembly.

This object is attained by supporting the device, to be tested, upon a vibratory member and causing said member to simulate as nearly as possible the vibrations to which the device may be subjected in actual commercial use. An indicator is connected with the device so that the effect of the vibration on the device may be observed to determine whether there are any imperfections in the device.

Referring to the drawings.

Figure 1:
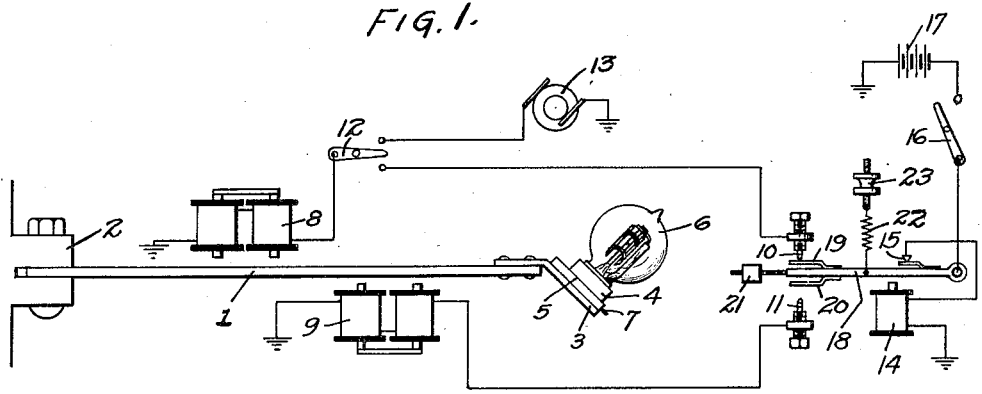
Fig. 1 is a diagrammatic view of a vibrating means for testing electrical devices such as audions.
Figure 2:
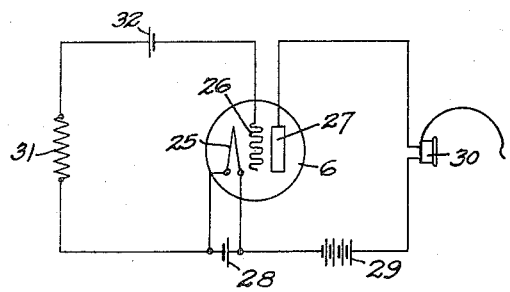
Fig. 2 is a diagram of the electrical connections between the device being tested and an indicating device.

A bar 1 is supported at one end by a member 2 and at its other end, there is attached a flexible member 3, preferably of sponge rubber of considerable thickness, which projects beyond the free end of the bar. The bar 1 is of suitable length and thickness so that it may be easily vibrated. A socket 4 having a base plate 5 is fastened to the member 3 and provides means for holding a vacuum tube or audion 6 to be tested. The base 5 of the socket is provided with a plurality of terminals 7 by means of which circuit connections may be made with the audion 6 in a manner hereinafter to be described. This plate may be fastened to the bar or support 1 in other planes than that shown. On this plate 3, a standard socket 4, having a base plate 5, may be fastened in any suitable manner, and this socket is adapted to receive a vacuum tube 6. It is to be understood, of course, that any other socket or holding means may be employed to hold and support other devices than vacuum tubes. In the case illustrated, the base 5 of the socket is provided with a plurality of terminals 7, only one of which is shown, to which connections may be made in a manner hereinafter to be described.

The bar 1 is actuated by magnets 8 and 9 and which preferably lie in the same plane, which are energized respectively by current supply thereto through the medium of adjustable contacts 10 and 11 of an interrupter device. The magnet 8 may be connected through a switch 12 to a source of alternating current 13 of approximately 60 cycles. This source of 60 cycle A. C. is provided so that even more irregular vibration may be imposed on the bar 1 when the magnet 8 is actuated by A. C. and the magnet 9 by D. C. The switching means or interrupter device comprises a magnet 14 connected through a self-interrupted contact 15 and switch 16 to a source of current 17. The magnet 14 is provided with an armature 18 to which the contact 15 is electrically connected. At one end the armature 18 is provided with spring terminals 19 and 20 which in their oscillation are adapted to make contact respectively with adjustable contacts 10 and 11. On the end of the armature 18 there is provided an adjustable weight 21 for the purpose of varying the period of varying the period of oscillation of the armature 18. A spring 22 connected to an adjacent screw 23 tends normally to hold the armature 18 in a fixed position. By adjusting the screw contacts 10 and 11 and the weight 21, the character of the impulses transmitted to the magnets 8 and 9 may be varied to increase the irregularity of the vibration of the bar 1. Magnet 8 may be given a strong long impulse whereas magnet 9 may be given a short weak impulse and so on. The flexibility of the member 3 further increases the irregularity of the vibrations to which the tube 6 is subjected.

By means of terminals 7 on the base 5 of the socket 4, the vacuum tube 6 may be connected to an indicating circuit. This tube 6 comprises the usual cathode 25, grid 26 and plate 27. A battery 28 heats the filament a definite amount and a battery 29 maintains a normal steady potential between the filament 25 and the plate 27. An indicating device, shown in the form of a head receiver set 30 is placed in series with the battery 29. A resistance 31 and a battery 32 is placed between the control electrode 26 and the cathode 25. By connecting the tube 6 to the indicating device 30 in this manner, the vibration of the tube, if the tube is perfect, will not appreciably affect the normal steady current flowing in the circuit, but if loose parts or other imperfections exist, these defects will cause a variation in the space relation of the electrodes and consequently cause a variation in the normal current which will be noted in the indicating device 30. If the tube being vibrated is perfect, there will be no appreciable indication in the receiver 30 since there is in that case nothing to vary the value of the current flowing through the receiver circuit.

It is evident that other electrical devices may be vibrated and their imperfections indicated in a similar way, and that purely mechanical devices may be tested by means of this vibrator without departing from the spirit of this invention.

What is claimed is:

1. The method of testing the rigidity of fixed electrodes of a vacuum tube having input and output circuits which consists in vibrating the tube and producing in the output circuit indications of the effect of the vibration.

2. The method of testing the rigidity of the fixed electrodes of a vacuum tube having input and output circuits which consists in providing an indicator in the output circuit, vibrating the tube and observing the effect of the vibration on said indicator.

3. A vibrating machine comprising a support for a device to be vibrated, electromagnetic means adapted to vibrate said support, and means for energizing said electromagnetic means sequentially.

4. A vibrating machine comprising a support for a device to be vibrated, electromagnetic means for vibrating said support and an electrical indicator connected to the device to be vibrated whereby the effect of vibration on said device may be indicated.

5. A vibrating machine comprising a support for a device to be tested, electromagnetic means for vibrating said support, means for energizing said electromagnetic means sequentially and irregularly, and electrical indicating means connected to the device to be vibrated whereby the effect of the vibration on said device may be indicated.

6. A testing machine for vacuum tubes comprising a vibratory support for a vacuum tube, a plurality of magnets for vibrating said support, switching means connected to said magnets, a source of current for said switching means and said magnets, and means whereby said switching means may be adjusted to cause the sequential energization of said magnets.

7. A machine for testing vacuum tubes comprising a vibratory support for a vacuum tube, a plurality of electromagnets for vibrating said support, switching means connected to said magnets, a source of current for said switching means and said magnets, a source of alternating current, and means whereby one of said magnets may be connected at will to said alternating current.

8. A machine for testing vacuum tubes for mechanical imperfections comprising a support for a tube to be tested, means for vibrating said support in an irregular manner, and indicating means connected to said tube whereby the effect of vibration on the tube may be indicated, said device indicating only when the tube being vibrated is imperfect.

9. A vibrating machine comprising a support for a device to be vibrated, electromagnetic means for vibrating said support and an electrical indicator connected to the device to be vibrated whereby the effect of the vibration on said device may be indicated, said indicating device indicating only when the device being vibrated develops imperfection.

In witness whereof, I hereunto subscribe my name this 2nd day of September, A. D., 1919.

HARALD J. VENNES.